United States Patent Office 3,004,676
Patented Oct. 17, 1961

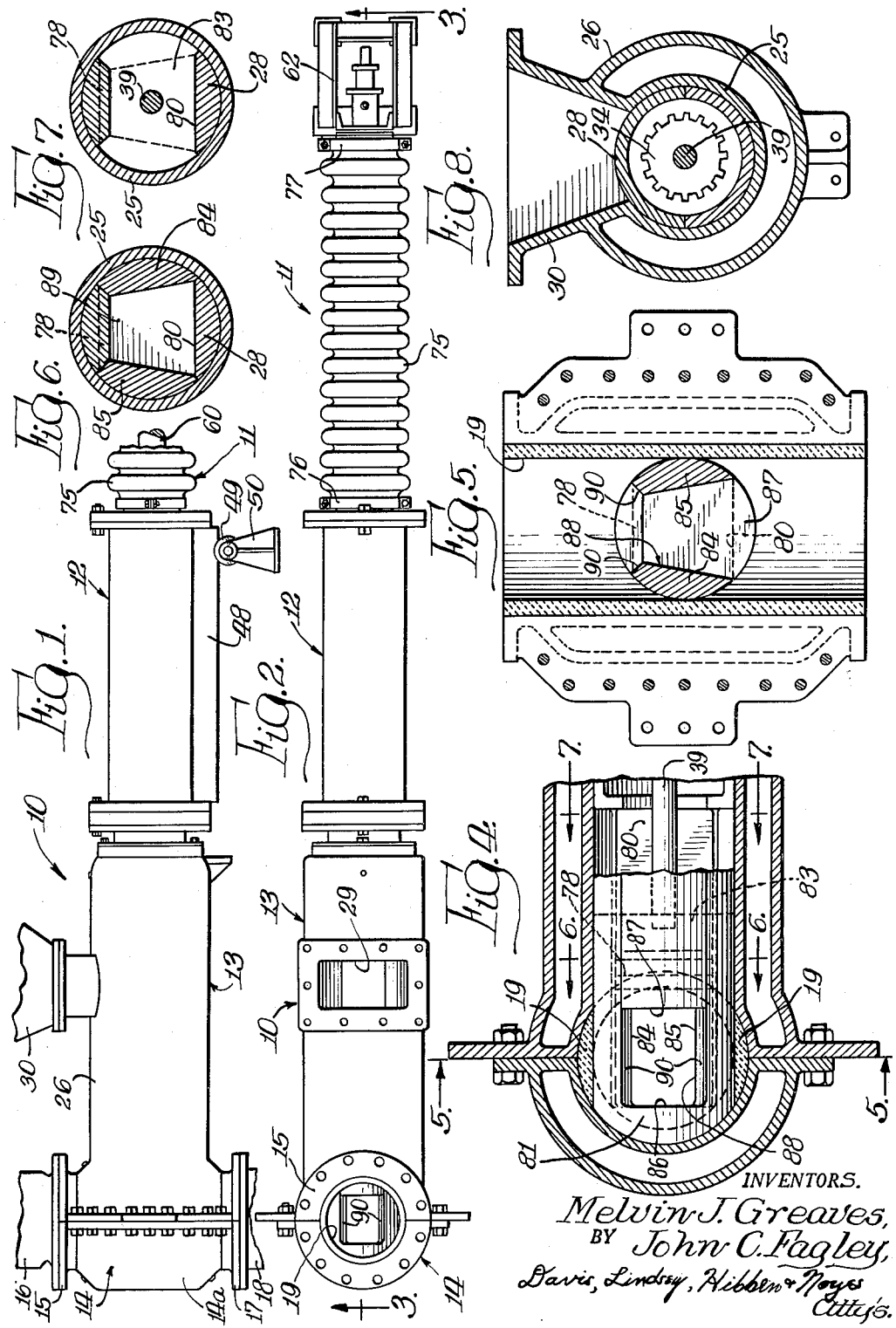

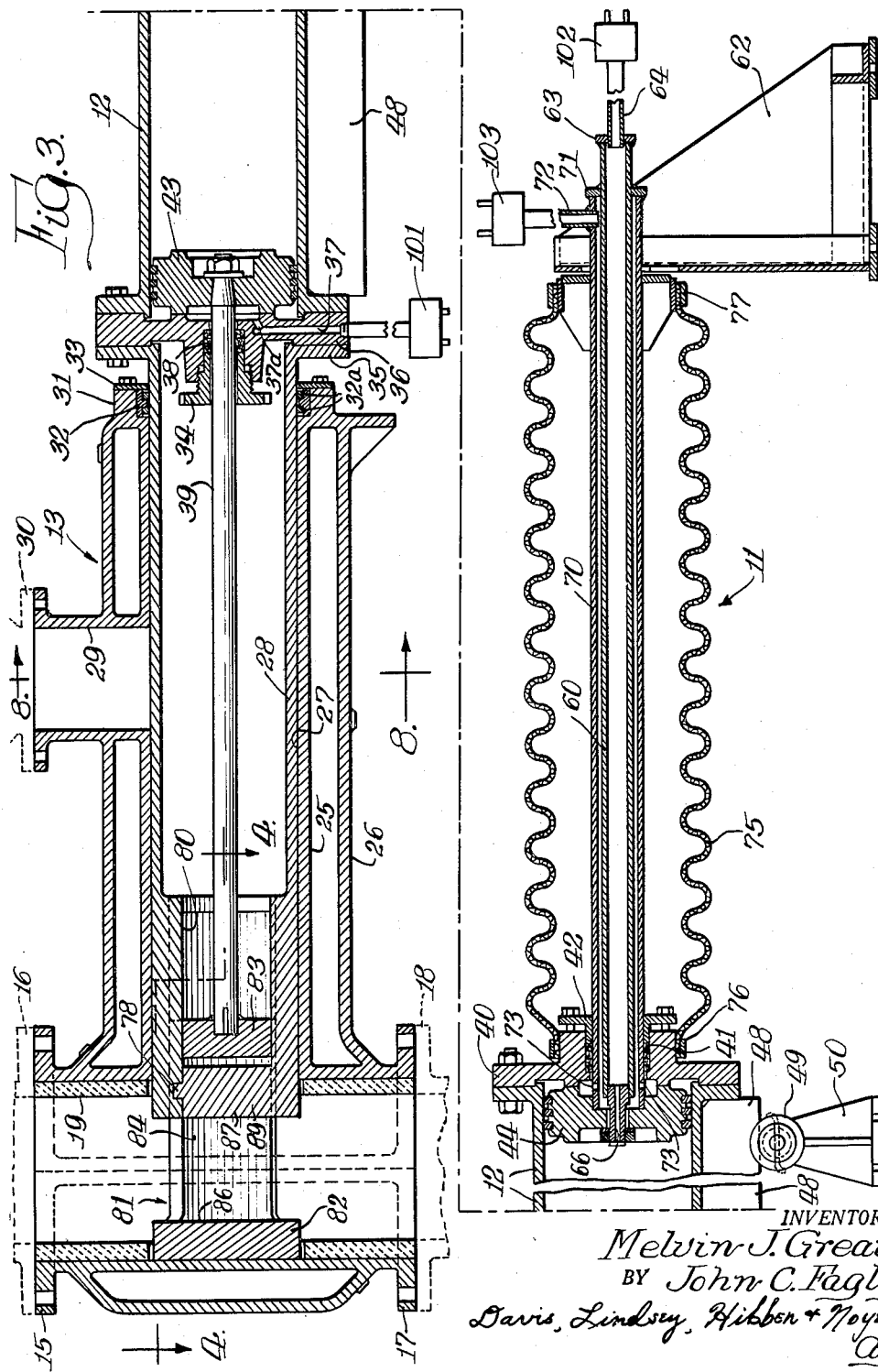

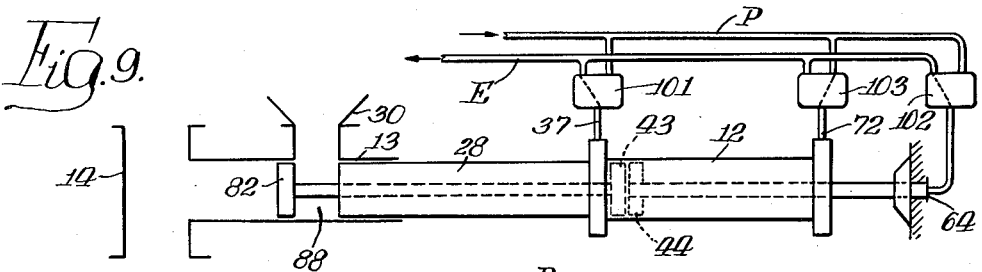
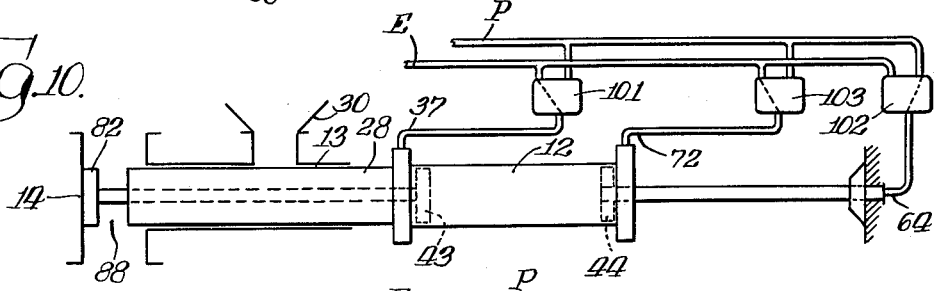
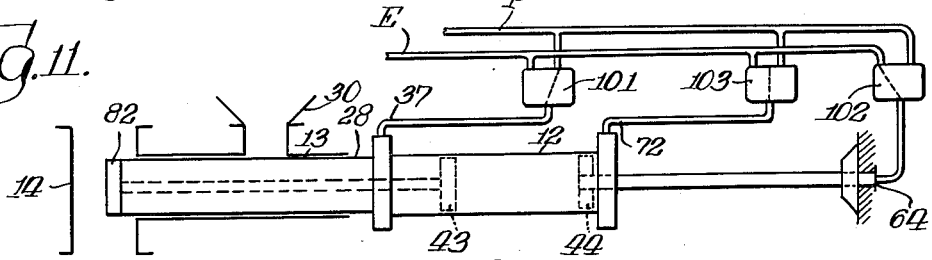
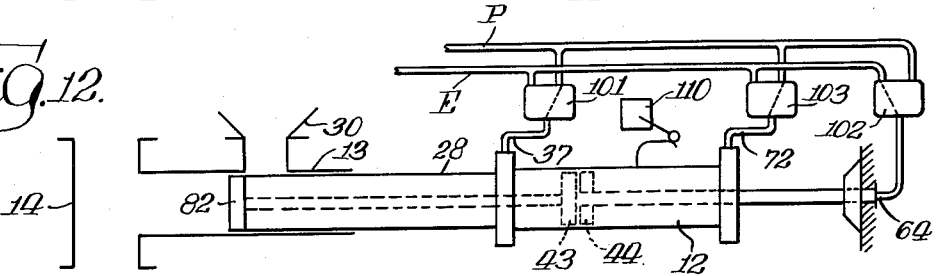
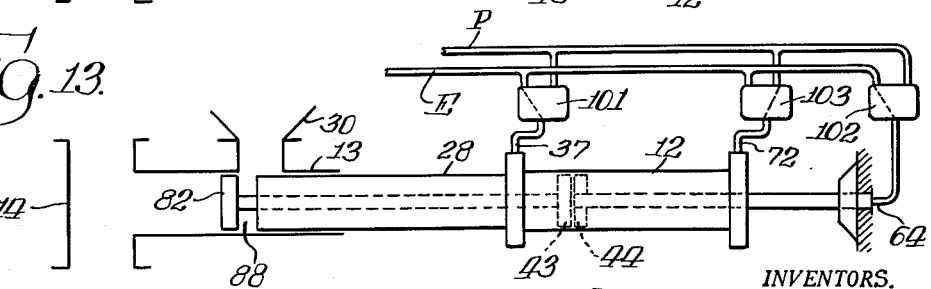

3,004,676
CHARGING APPARATUS
Melvin J. Greaves and John C. Fagley, Cleveland, Ohio, assignors, by mesne assignments, to Inland Steel Company, Chicago, Ill., a corporation of Delaware
Filed Nov. 16, 1959, Ser. No. 853,367
8 Claims. (Cl. 214—18)

The present invention relates generally to apparatus for charging a substance into a chamber containing a fluid, and more particularly, to improved apparatus for charging a solid fuel into the melting hearth of a metallurgical furnace so as to prevent the escape of noxious gases from the melting hearth through the charging apparatus.

In certain ore smelting processes, the reduction of a finely divided iron ore is effected by intimately contacting the ore with a reducing gas within a reduction column followed by passing the reduced ore from the reduction column to a melting hearth, preferably by gravity, through a vertically disposed connecting conduit. In the melting hearth, the reduced ore is melted and separated from the gangue of the ore by means of heat produced therein by burning coal or other carbonaceous matter with oxygen. The molten iron is also protected against reoxidation by the presence of excess carbon. Frequently, a certain amount of unreduced ore remains in the effluent solids from the reduction column, and in such cases the reduction is completed in the hearth by providing the hearth with a quantity of added carbon in the form of coal or other carbonaceous matter, preferably admixed with the solids from the reduction column.

In order to introduce the coal or like carbonaceous material into the hearth along with the solids from the reduction column, it has been found most convenient to provide means between the lower outlet of the reduction column and the upper inlet of the melting hearth for charging coal, or the like, into the hearth. Since the hearth zone contains, among other noxious gases, a considerable quantity of poisonous carbon monoxide gas, it is important, from plant safety considerations, to avoid releasing the carbon monoxide-containing gases into the surrounding atmosphere of the plant.

Accordingly, it is the principal object of the present invention to provide an improved apparatus for charging a substance into a reaction zone which prevents escape of fluid matter from within the said reaction zone.

It is a further object of the present invention to provide an improved positive displacement reciprocating feeder apparatus for charging a solid into a reaction zone which prevents escape of gases from within said reaction zone by maintaining at all times a positive mechanical seal between reciprocating parts of the feeder apparatus.

Still another object of the present invention is to provide an improved apparatus for feeding coal to a melting hearth containing noxious gases which prevents escape of noxious gases from the said hearth.

Another object of the present invention is to provide an improved double-piston fluid cylinder assembly having wide flexibility in the transmission of reciprocal motion.

It is a still further object of the present invention to provide an improved reciprocable feeder apparatus having a double-piston single-cylinder actuating means.

Other objects of the present invention will be apparent to those skilled in the art.

The preferred means of achieving the foregoing and other objects of the present invention will be readily understood by those skilled in the art from the detailed description and claims to follow, when read in conjunction with the accompanying drawing wherein:

FIGURE 1 is a fragmentary side elevational view of the apparatus of the present invention;

FIG. 2 is a top plan view of the apparatus of the present invention shown in FIGURE 1;

FIG. 3 is a vertical sectional view on an enlarged scale taken along the line 3—3 of FIG. 2;

FIG. 4 is a fragmentary horizontal sectional view taken along the line 4—4 of FIG. 3;

FIG. 5 is a vertical sectional view taken along the line 5—5 of FIG. 4;

FIG. 6 is a vertical sectional view taken along the line 6—6 of FIG. 4;

FIG. 7 is a vertical sectional view taken along the line 7—7 of FIG. 4;

FIG. 8 is a vertical sectional view taken along the line 8—8 of FIG. 3;

FIG. 9 is a schematic view of the apparatus of the present invention and associated fluid pressure sources operatively connected therewith when the apparatus is in loading position;

FIG. 10 is a schematic view of the apparatus of the present invention and associated fluid pressure sources operatively connected therewith when the apparatus is in charging position;

FIG. 11 is a schematic view of the apparatus of the present invention and associated fluid pressure sources operatively connected therewith when the apparatus has the chamber thereof collapsed;

FIG. 12 is a schematic view of the apparatus of the present invention and associated fluid pressure sources operatively connected therewith when the apparatus is in retracted position at the end of cycle and just before the chamber thereof opens; and FIG. 13 is a schematic view of the apparatus of the present invention and associated fluid pressure sources operatively connected therewith when the apparatus commences a new cycle and the chamber thereof begins to open to receive therein a new charge.

In general, the present invention comprises a reciprocating charging or loading apparatus which conveys material held between spaced relatively movable chamber-forming elements from a charging hopper or storage bin to a laterally spaced discharge point while maintaining at all times a positive seal against the passage of fluids between the hopper and the discharge point and without entrapping or conveying any gases from the point of discharge back to the charging hopper through or between the chamber forming elements. More particularly, the preferred embodiment of said apparatus is comprised of a movable fluid cylinder having a stationary piston assembly disposed in one end of the cylinder, a reciprocating plunger assembly and movable piston associated with the other end of the movable fluid cylinder, and a housing section for said plunger assembly having spaced openings therein which communicate with a charging hopper and discharge opening, respectively, said plunger assembly comprising a plunger body section with a plunger portion movably mounted in the outer end of the plunger body section to form collapsible chamber end elements for receiving therebetween and conveying a charge of material from the charging hopper to a longitudinally spaced discharge point.

In the preferred embodiment of the present invention shown in the drawing, the coal feeding apparatus 10 (FIGS. 1 and 2) is comprised generally of a fixed piston assembly 11, a movable fluid cylinder 12 having a plunger assembly associated therewith, and a plunger assembly housing section 13 provided with an open transverse end passage section 14 having a detachable end cover 14a adapted to being water cooled, which is sealably secured at its upper end 15 to a conduit 16 extending from the discharge end of the ore reduction column (not shown) and at its lower end 17 to the inlet 18 to the melting hearth furnace (not shown). The transverse passage section 14 is preferably provided with a refractory lining 19 to prevent hot gases from the hearth and the hot reduced ore solids damaging the housing section 13.

The plunger assembly housing section 13 is formed with spaced outer wall sections 25, 26 (FIG. 3) for circulation of cooling water therethrough and has an elongated axial passage 27 extending therethrough which sealably accommodates a reciprocable plunger assembly including a plunger body section 28. The housing section 13 has intermediate the ends thereof an opening in the upper lateral surface which provides a passage 29 communicating with a coal hopper or supply means 30. In a counterbore adjacent the outer end 31 of the housing section 13 is a piston ring assembly 32 with a plurality of piston rings 32a which forms a seal between the housing 13 and the movable plunger body section 28, said ring assembly being held in position by a retaining ring 33.

The plunger body section 28 has a generally hollow cylindrical form and is closed at its outer end by mounting on the end flange 35 a cylinder cover member 36 which is provided with an axial passage 38 extending therethrough for slidably receiving therein a piston rod 39 which is sealed by suitable packing held in place by a gland fitting 34. The cover member 36 also has a radially extending passageway 37 which communicates with the interior of the fluid cylinder 12 through a connecting port 37a spaced radially from the axial passage 38. The cover member 36 additionally serves as a cover for the inner end of the movable fluid cylinder 12 disposed in axial alignment with, and sealably secured to the flange 35 of the cylindrical plunger body section 28. The fluid cylinder 12 is closed at the other end by a cover member 40 having an axial passage 41 which is adapted to reciprocably and sealably receive therein the piston rod of the fixed piston assembly 11.

The fluid cylinder 12 has reciprocably mounted therein a piston 43 fixedly secured to the end of piston rod 39, and a piston 44 comprising part of the fixed piston assembly 11. A rail or shaft 48 extends longitudinally from the lower surface of the movable cylinder 12 and is adapted to contact a supporting roller assembly 49 mounted in a roller bracket 50.

The fixed piston rod assembly 11 is comprised of an inner small-diameter tubular member 60 and an outer larger diameter tubular conduit member 70 mounted concentrically about the member 60 but spaced therefrom and fixedly secured at one end to the stationary bracket 62. The outer end 63 of the tubular member 60 is provided with a fluid port 64 which is adapted to be alternately connected with a suitable source of fluid pressure or an exhaust manifold, as required. The piston 44 is rigidly mounted at the inner end of the tubular member 70 so that the latter functions as a hollow piston rod for the piston 44 and forms a sealing engagement with end cover 40 by means of suitable packing held in the passage 41 by a packing gland 42. The piston 44 also has an axial fluid conduit member or port 66 fixedly mounted therein and connected with the tubular member 60 providing fluid communications between the port 64 and the interior of the cylinder 12. The outer tubular conduit member 70 adjacent its closed outer end 71 is also provided with a fluid port 72 adapted to communicate with a source of fluid pressure or exhaust manifold, as required. The inner end of the tubular member 70 is provided with radial ports 73 which communicate with the interior of the cylinder 12 but on the opposite side of the piston 44 from the port 66. A flexible dust boot 75 encloses the piston assembly 11 and is held in position at opposite ends by suitable clamps 76, 77.

The plunger body section 28 is formed from upper and lower half sections (as best seen in FIG. 3) which are held together at the end adjacent passage 14 by means of an upright end wall 89 extending integrally from the lower half and keyed, as at 78, to the upper half. The plunger body section 28 with the piston rod 39 extending axially therethrough has reciprocably disposed in a longitudinal slot or guideway 80 formed in the keyed inner end thereof a chamber-forming plunger member 81 which is secured to the end of the piston rod 39. The reciprocable chamber-forming plunger member 81 has an enlarged end section 82 having substantially the same diameter as the plunger body section 28. The plunger member 81 at a point spaced axially from the enlarged end section 82 and at the opposite side of the wall 89 is also provided with a transverse outer end wall section 83 to which the piston rod 39 is rigidly secured and which slidably engages the guideway 80. The axially spaced end sections 82, 83 of the plunger member 81 are integrally connected by lateral wall sections 84, 85 (FIGS. 4 and 5) extending in laterally spaced relationship. Thus, the opposed wall surfaces of the lateral walls 84, 85 together with the opposed wall surfaces 86, 87 of the plunger end sections 82 and the plunger body end wall 89, respectively, define a collapsible open-ended transverse cavity or chamber 88 which is generally rectangular and is symmetrically disposed with respect to the longitudinal axis of the vertical passage 14 when the plunger member 81 and the plunger body section 28 are in their extended discharge position as shown in FIGS. 3 and 4. The inner surfaces of the lateral wall sections 84, 85 are parallel with the longitudinal axis of the plunger assembly 28—81. However, the upper portions of the lateral sections 84, 85 are somewhat thicker than the lower portions, whereby the chamber 88 has a generally tapered downwardly enlarging configuration which facilitates discharge of material therefrom into the hearth zone. The upper edges of the walls 84, 85 at the upper end of the cavity or chamber 88 are also provided with outwardly flared portions 90. The oppositely disposed end wall surfaces 86, 87 forming end walls of the cavity or chamber 88 are straight and parallel with the longitudinal axis of the transverse passage section 14. The opposed wall surfaces 86, 87 and the peripheral contact surfaces of the plunger mechanism 28—81 and its mating bore 27 are preferably precision ground for optimum fit with minimum clearances; thereby forming an effective seal against the escape of gas or other fluids during operation of the device as hereinafter described.

*Operation*

The several steps of the operating cycle of the apparatus shown in FIGS. 1–8 of the drawing are schematically illustrated in FIGS. 9–13 of the drawing. Thus, in FIG. 9 is shown the operative relationship of the several moving parts of the apparatus and a plurality of three-way solenoid valves 101, 102, and 103 associated therewith during the material charging or loading step. When the apparatus 10 is in position to receive a charge of material, such as pulverized coal, from the hopper 30, the fluid cylinder 12 is in its extreme outer or retracted position and the movable piston 43 and the fixed piston 44 are substantially in abutment at the extreme inner or left end of the fluid cylinder 12. This positioning of the parts is accomplished by applying fluid pressure from the line P to the outer or right side of fixed piston 44 through solenoid valve 103 and ports 72 and 73 into the interior of cylinder 12 while at the same time exhausting the fluid pressure on the inner or left side of piston 44 through ports 66 and 64 and solenoid valve 102 which is connected to an exhaust manifold E. Also, during movement of the cylinder 12 to its outer or retracted position, fluid is exhausted from the inner end of the cylinder 12 through ports 37a, 37, and the solenoid valve 101. With the cylinder 12 in its extreme retracted or outer position, the plunger body section 28 is also maintained in its extreme retracted or outer position while the plunger 81 is maintained in its extreme extended position so that the chamber 88 is fully open and is disposed directly below the hopper 30 from which coal is fed into the chamber 88.

FIG. 10 shows the operative relationship of the movable parts of the apparatus in the discharge or dumping position, wherein the fluid cylinder 12, plunger body section 28, and plunger member 81, are disposed in their extended or inner positions. Thus, with the plunger member 81 remaining in its extreme extended position, the fluid cylinder 12 and the plunger section 28 integral therewith are moved to their extended position by withdrawing fluid from the outer or right end of fluid cylinder 12 through solenoid valve 103, while at the same time applying fluid pressure into the interior of fluid cylinder 12 between the pistons 43, 44 through valve 102 and associated passages. With the pistons 43, 44 and the cylinder 12 in the positions shown in FIG. 10, the plunger body section 28 and the plunger member 81 having the charge of coal disposed therebetween in the chamber 88 have thereby been simultaneously moved into the transverse passage section 14 where the charge drops from the chamber 88 into the hearth zone. Since the exterior lateral wall surface of the plunger body section 28 forms a positive sealing engagement at all times with the interior cylindrical wall surface 27 of the housing section 13, the gases in passage 14 cannot escape through the said housing section into the hopper 30 and the surrounding atmosphere.

If at this step in the operating cycle, plunger body section 28 were withdrawn from the passage 14 with the plunger member 81 in the extended or inner position and again disposed below the hopper 30 in position to receive the next charge, a quantity of gas, such as noxious carbon monoxide, would be entrapped within the chamber 88 and withdrawn from the passage 14 and be free to escape into the surrounding atmosphere through the aggregate in the hopper 30. To avoid this, the plunger member 81 (as best shown in FIG. 11) is first moved to its outer or retracted position while the plunger body section 28 remains stationary to collapse the chamber 88 formed between the plunger end 82 and the transverse end face 87 of the plunger body section 28. This collapsing action is accomplished, as shown in FIG. 11, by applying fluid pressure to the inner or left side of piston 43 through valve 101 and ports 37, 37a while exhausting fluid from the medial portion of cylinder 12 through ports 66, 64 and valve 102. The valve 103 is maintained in "closed" position out of communication with the lines "P" and "E" during the collapsing of the chamber 88.

With the plunger member 81 maintained in a retracted position in the above manner, the plunger body section 28 and the abutting plunger end 82 are withdrawn from the transverse passage 14 without withdrawing any noxious gases. This movement is accomplished, as shown in FIG. 12, by applying fluid pressure to the outer or right end of the fluid cylinder 12 at the outer surface of piston 44 through valve 103 and port 72, while continuing to apply fluid pressure through valve 101 and ports 37, 37a to the inner or left side of piston 43 in order to maintain plunger end 82 in retracted position. At the same time valve 102 allows exhaust of fluid from the medial portion of cylinder 12 through ports 66, 64. At this point, piston 43 abuts the fixed piston 44, the edge of plunger end 82 is aligned with the discharge opening from hopper 30, and the operating cycle is complete.

When it is desired to feed another charge of coal from hopper 30 for transport to the point of discharge above the hearth, the plunger body section 28 is moved further outwardly, as shown in FIG. 13, by shifting valve 101 so as to exhaust fluid from the inner or left end of the fluid cylinder 12 through ports 37a, 37 and 101, while continuing to apply fluid pressure to the outer or right end of movable fluid cylinder 12 through valve 103 and ports 72, 73. Valve 102 remains in exhaust position. Eventually, cylinder 12 reaches its extreme outer or retracted position and cavity 88 is completely open beneath the hopper 30, as in FIG. 9. With the pistons 43, 44 and cylinder 12 in the latter positions, the material in hopper 30 can flow into the open chamber 88 and the charging cycle is repeated.

The operating cycle heretofore described and effected through the 3-way solenoid valves 101, 102 and 103 which are connected with the fluid ports 37—37a, 64—66, and 72—73, respectively, are controlled by any suitable master timer, such as a timer having a plurality of cam tracks with associated solenoid electrical contact switches or the like. A mechanical limit switch 110 shown in FIG. 12, signals the completion of one cycle and releases the controls for the start of the next cycle. At the end of each cycle, after the limit switch 110 is tripped, the reciprocating charge conveying mechanism comprised of the plunger body 28 and plunger 81 pauses momentarily before opening to receive the next charge, as shown in FIG. 12, until the present master timer closes a contact, whereupon, the solenoid valve 101 is moved from positive pressure (P) to exhaust (E) as shown in FIGS. 12 and 13. When the charge conveying mechanism then shifts to the open position of FIG. 9, a time-delay relay which is actuated by the master timer simultaneously changes the solenoid valves 102 and 103 to the positions shown in FIG. 10, and the plunger 81 moves the charge, such as coal or other material, to the discharge end of the housing section 13 (see FIG. 10).

A second time-delay relay holds the charge conveying mechanism in discharge position sufficiently long for the charge to empty therefrom and then changes the valve 101 from exhaust to pressure and valve 102 from pressure to exhaust, in order to retract plunger end 82 whereby the "chamber" 88 of the charge conveying mechanism is closed so that gases will not be entrapped therein. During this period of the operating cycle, the valve 103 is moved to "closed" position to maintain the plunger body 28 stationary.

A third time-delay relay then moves valve 103 to apply pressure to the outer end of cylinder 12 to withdraw the plunger assembly 28—81 until it contacts the limit switch 110 which resets the master timer, and the sequence of operations is repeated.

It will be understood, of course, that other arrangements of limit switches and control devices, both electrical and mechanical, could be used to effect the foregoing sequence of operations.

The fluid cylinder 12 of the herein described preferred form of the invention is preferably operated by means of air being supplied from a suitable air pressure tank through an air inlet line (P) and withdrawn through an exhaust manifold (E). It will be understood, however, that other fluids besides air can be used, such as oil or similar hydraulic fluid commonly used in hydraulic mechanisms.

It should also be understood that the reciprocable plunger feed mechanism 28—81 can be actuated through the described operating cycle by any suitable means other than the double piston-movable cylinder arrangement shown herein. Also, the double piston-movable cylinder mechanism can be used for applications, other than the disclosed feeding device, where it is desired to provide reciprocating motive power in a variety of sequences.

And, while the apparatus as herein illustrated is applied to charging coal to a melting hearth containing noxious gases, the apparatus can also be used to supply any material to a chamber or reaction zone containing a fluid, gaseous or liquid, where the said fluid must be sealably retained within a chamber or reaction zone at all times, or where the chamber or reaction zone must be maintained isolated from the surrounding atmosphere at all times.

We claim:
1. In a charging apparatus including a charge conveying plunger assembly reciprocably and sealably disposed in a housing section having spaced inlet and outlet openings therein, said plunger assembly reciprocably movable between said inlet opening and said outlet opening and adapted to receive a charge of material at said inlet opening and to convey said material to said outlet opening which communicates with a noxious fluid-containing passage associated with said housing section, the improvement comprising: a charge conveying plunger assembly having a plunger body section forming a sealing engagement with the said housing section throughout substantially the entire length thereof to prevent fluid passing therebetween, said plunger body section being operatively connected at one end with fluid means for effecting reciprocable longitudinal movement of the other end thereof from a point rearwardly of said inlet opening to a point forwardly of said outlet opening and extending into said fluid containing passage when said body section is in its most forwardly position, a plunger member reciprocably mounted in said other end of said plunger body section and forming a sealable sliding engagement with said housing section between said inlet and outlet openings, said plunger member being operatively connected with means reciprocably moving said plunger member alternately into spaced and abutting relationship with said other end of said plunger body section independently of movement of said plunger body section, said plunger member in the most rearwardly position of said plunger body section being sealably disposed in said housing section adjacent said inlet opening and in spaced relationship with said other end of said plunger body section forming together with said plunger body section a collapsible material receiving chamber disposed below said inlet opening for receiving a charge of material and movable as a unit from said inlet opening into said fluid passage, and said plunger member in the most forwardly position of said plunger body section when disposed in said fluid passage being movable from said spaced relationship to an abutting relationship with said other end of said body section to collapse said chamber before said plunger body section is moved from said fluid passage into said housing section; whereby, said reciprocably disposed plunger assembly periodically conveys material from said inlet opening to said outlet opening without permitting escape of a noxious fluid into the surrounding atmosphere through said inlet opening.

2. A charging apparatus as in claim 1, wherein the said plunger member is comprised of spaced end sections with spaced lateral wall sections connecting the said end sections, one of said end sections and the said spaced lateral wall sections being reciprocably mounted within a guideway in the end of the said plunger body section and the other of said end sections together with the opposing end surface of said plunger body section and said wall sections forming said material receiving chamber with a transverse passage extending therethrough when the said other end section of said plunger member is spaced from the said plunger body section at said inlet and outlet openings, and said other end section also adapted to be moved into abutting relationship with the said end surface of said plunger body section to collapse said material receiving chamber at said outlet opening; whereby said chamber is movable from fully open to fully collapsed position after discharge of material therefrom and before moving the plunger member away from the discharge opening into said body section which prevents entrapment and withdrawal of said fluid from said fluid passage.

3. In a charging apparatus including a charge conveying assembly reciprocably and sealably disposed in a housing section having spaced inlet and outlet openings therein, said plunger assembly reciprocably movable between said inlet opening and said outlet opening and adapted to receive a charge of material at said inlet opening and to discharge said material at said outlet opening into a fluid-containing passage connected with said housing section, the improvement comprising: a charge conveying plunger assembly having a plunger body section forming a sliding sealing engagement with said housing section throughout substantially the entire length thereof to prevent fluid passing therebetween and being operatively connected at one end with a fluid cylinder assembly for reciprocable movement thereof longitudinally within said housing section, a plunger member reciprocably mounted in the other end of said plunger body section and operatively connected with said fluid cylinder assembly for reciprocable movement alternating into spaced and abutting relationship with said other end of said body section independently of movement of said plunger body section, said plunger member forming a sealing sliding engagement with said housing section as said plunger member is moved between said inlet and outlet openings, said plunger member when disposed in said spaced relationship forming with said plunger body section an open-ended chamber for receiving at said inlet opening and discharging into said passage a charge of material, and said fluid cylinder assembly including a fluid cylinder having a first piston mounted in one end thereof and a second piston mounted in the other end thereof, and said fluid cylinder assembly being provided with associated means for reciprocably and independently moving said plunger member and said plunger body section, respectively; whereby the said plunger assembly conveys material from said inlet opening to said outlet opening where said material is discharged into said passage.

4. A charging apparatus as in claim 3, wherein said means for reciprocably and independently moving said plunger member and plunger body section comprises fluid pressure regulating means adapted to introduce into and exhaust fluid from the portions of said fluid cylinder between each of the ends thereof and the respective first and second pistons mounted adjacent thereto and the portion of the fluid cylinder intermediate the said pistons mounted therein.

5. A charging apparatus as in claim 3, wherein said second piston mounted in said other end of said fluid cylinder is fixedly mounted against reciprocable movement and said first piston mounted in said one end of said fluid cylinder is reciprocably movable relative to said fluid cylinder and said second piston, said fluid cylinder being reciprocably movable with respect to said second piston, and fluid pressure regulating means with associated conduit means are provided for introducing and exhausting fluid from the portions of said fluid cylinder between each end of the fluid cylinder and the piston mounted adjacent thereto and also introducing and exhausting fluid from the portion of the fluid cylinder between said pistons mounted therein.

6. A charging apparatus as in claim 5, wherein the said second piston which is held fixedly against reciprocating movement in the fluid cylinder has an axial passage extending therethrough communicating with an axial passage in a fixed piston rod to which the said piston is secured, said axial passage providing for the introduction and exhausting of fluid from between the said pistons of the fluid cylinder, and a fluid conduit means is mounted coaxially about the said fixed piston rod for introducing fluid into and exhausting fluid from the portion of the fluid cylinder between the fixed piston and the adjacent end of the fluid cylinder.

7. A charging apparatus comprising in combination, a charge conveying plunger assembly operatively connected with a fluid cylinder assembly reciprocably and sealably disposed in a housing section having spaced inlet and outlet openings for conveying a charge of material from said inlet opening to said outlet opening, said plunger assembly having a plunger body section forming a sealing engagement with the housing section throughout substantially the entire length thereof to prevent a fluid passing therebetween, a chamber-forming plunger member reciprocably mounted in one end of said plunger body section, said plunger member in its extended position forming with said plunger body section an open-ended chamber for receiving and discharging a charge of material, and a fluid cylinder assembly for reciprocably and independently moving said plunger member and said plunger body section, said fluid cylinder assembly comprising a reciprocable fluid cylinder having a fixed piston assembly mounted in one end thereof with said plunger body section rigidly secured to the other end thereof for reciprocable movement together with said cylinder and a movable piston reciprocably mounted in said other end of the fluid cylinder having a piston rod affixed thereto which extends axially into said plunger body section and is fixedly secured to the said plunger member, and fluid conduit and control means associated with said fluid cylinder for introducing and exhausting actuating fluid from the portions of the said cylinder between the ends thereof and the adjacent piston and the portion of the said cylinder between the said pistons mounted therein; whereby said plunger member and said plunger body section can be reciprocably moved independently to effect opening and closing of the said chamber and longitudinal movement of the said chamber without permitting escape of fluid through said chamber.

8. A charging apparatus comprising in combination a reciprocable fluid cylinder having a fixed piston assembly mounted in one end thereof and a plunger body section rigidly secured to the other end thereof for reciprocating movement in unison with said cylinder, a movable piston means reciprocably mounted in said other end of said fluid cylinder and having a piston rod means affixed thereto extending axially within said plunger body section, and a plunger housing section within which said plunger body section is reciprocably and sealably disposed, a plunger member sealably mounted in one end of said plunger body section for reciprocable longitudinal movement within said housing section, said plunger member being secured to said piston rod means for independently moving said plunger member longitudinally relative to said plunger body section and said plunger member being alternately movable into spaced and abutting relationship with said one end of said body section forming opposite end wall elements of a collapsible material receiving chamber therebetween, said housing section having an inlet opening communicating with a material supply container and a discharge outlet communicating with a fluid-containing passage and fluid means for effecting reciprocable longitudinal movement of said fluid cylinder and said plunger member to transport material from said inlet opening to said discharge outlet and to collapse said material receiving chamber.

References Cited in the file of this patent

UNITED STATES PATENTS

| | | |
|---|---|---|
| 451,395 | Birkholz | Apr. 28, 1891 |
| 2,004,533 | Maynard | June 11, 1935 |